US010360564B1

(12) United States Patent
Apple et al.

(10) Patent No.: US 10,360,564 B1
(45) Date of Patent: *Jul. 23, 2019

(54) AUTOMATED COMPLIANCE SCRIPTING AND VERIFICATION

(71) Applicant: Wells Fargo Bank, N.A., San Francisco, CA (US)

(72) Inventors: John Raymond Apple, San Francisco, CA (US); Gary Brewer, Taylorsville, UT (US); Mary Lynn Leary, Phoenix, AZ (US); Chirag S. Shah, Highlands Ranch, CO (US); Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,678

(22) Filed: Sep. 5, 2017

Related U.S. Application Data

(63) Continuation of application No. 14/989,278, filed on Jan. 6, 2016, now Pat. No. 9,754,263.

(Continued)

(51) Int. Cl.
*H04M 3/00* (2006.01)
*H04M 5/00* (2006.01)
(Continued)

(52) U.S. Cl.
CPC ......... *G06Q 30/016* (2013.01); *G06F 3/0481* (2013.01); *G06F 3/04842* (2013.01);
(Continued)

(58) Field of Classification Search
CPC ......... H04M 3/5175; H04M 2203/258; H04M 2203/408; H04M 3/5183; H04M 3/51;
(Continued)

(56) References Cited

U.S. PATENT DOCUMENTS

| 5,309,505 A | 5/1994 | Szlam et al. |
| 5,539,818 A | 7/1996 | Zdenek et al. |

(Continued)

OTHER PUBLICATIONS

"U.S. Appl. No. 14/989,278, Non Final Office Action dated Nov. 28, 2016", 9 pgs.

(Continued)

*Primary Examiner* — Thjuan K Addy
(74) *Attorney, Agent, or Firm* — Schwegman Lundberg & Woessner, P.A.

(57) ABSTRACT

In an example, a method for implementing a disclosure message requirement may include operations to detect a condition requiring an output of the disclosure message and to control output of the disclosure message, in a communication session that follows a process workflow. The process workflow may be modified to include pausing further actions in the process workflow, outputting of the disclosure message in the communication session, and then resuming actions in the process workflow in response to successfully outputting the entire disclosure message to a customer user. In some examples, the communication session involves a telephone call session between a customer service agent and a customer. In some examples, user interface functions related to the process workflow are disabled and then enabled, to prevent the agent from proceeding in the process workflow for a product or service until the disclosure has been successfully output.

20 Claims, 7 Drawing Sheets

Related U.S. Application Data

(60) Provisional application No. 62/248,235, filed on Oct. 29, 2015, provisional application No. 62/200,840, filed on Aug. 4, 2015.

(51) Int. Cl.
  *G06Q 30/00* (2012.01)
  *G06F 3/0484* (2013.01)
  *G06F 3/0481* (2013.01)
  *G06Q 30/02* (2012.01)
  *G06F 3/16* (2006.01)

(52) U.S. Cl.
  CPC ......... *G06F 3/167* (2013.01); *G06Q 30/0185* (2013.01); *G06Q 30/0281* (2013.01)

(58) Field of Classification Search
  CPC .......... H04M 2203/105; G06Q 30/016; G06Q 40/025
  USPC ............ 379/265.06, 265.03, 266.07, 265.09, 379/265.05
  See application file for complete search history.

(56) References Cited

U.S. PATENT DOCUMENTS

| | | | |
|---|---|---|---|
| 6,100,891 A | 8/2000 | Thorne et al. | |
| 6,356,634 B1 | 3/2002 | Noble, Jr. | |
| 6,724,887 B1 | 4/2004 | Eilbacher et al. | |
| 6,771,746 B2 | 8/2004 | Shambaugh et al. | |
| 6,826,745 B2 | 11/2004 | Coker et al. | |
| 6,975,709 B2 | 12/2005 | Wullert, II | |
| 7,213,209 B2 | 5/2007 | Lueckhoff et al. | |
| 7,631,314 B2 * | 12/2009 | Joseph | H04L 67/02 707/999.01 |
| 7,653,195 B2 | 1/2010 | Shimpi et al. | |
| 7,739,115 B1 | 6/2010 | Pettay et al. | |
| 8,363,796 B2 | 1/2013 | Adkar et al. | |
| 8,504,371 B1 | 8/2013 | Vacek et al. | |
| 8,693,644 B1 | 4/2014 | Hodges, Jr. et al. | |
| 8,774,392 B2 | 7/2014 | Odinak et al. | |
| 8,775,180 B1 | 7/2014 | Pettay | |
| 8,793,581 B2 | 7/2014 | Sirstins | |
| 9,094,512 B2 | 7/2015 | Sheldon et al. | |
| 9,112,971 B2 | 8/2015 | Munns et al. | |
| 9,172,805 B1 | 10/2015 | Jayapalan et al. | |
| 9,754,263 B1 | 9/2017 | Apple | |
| 2012/0066141 A1 | 3/2012 | Williams | |
| 2014/0241519 A1 | 8/2014 | Watson et al. | |
| 2014/0270146 A1 | 9/2014 | Riahi et al. | |
| 2015/0046514 A1 | 2/2015 | Madan et al. | |
| 2015/0066504 A1 | 3/2015 | Iannone et al. | |
| 2015/0124952 A1 | 5/2015 | Hoen, IV et al. | |

OTHER PUBLICATIONS

"U.S. Appl. No. 14/989,278, Notice of Allowance dated May 5, 2017", 5 pgs.

"U.S. Appl. No. 14/989,278, response filed Feb. 28, 2017 to Non Final Office Action dated Nov. 28, 2016", 12 pgs.

* cited by examiner

AUTOMATED COMPLIANCE SCRIPTING AND VERIFICATION

RELATED APPLICATIONS

This application is a continuation of U.S. patent application Ser. No. 14/989,278, filed Jan. 6, 2016, now issued as U.S. Pat. No. 9,754,263, which claims the benefit of U.S. Provisional Patent Application Ser. No. 62/200,840, titled "Automatic Notification Generation," filed Aug. 4, 2015, and the benefit of U.S. Provisional Patent Application Ser. No. 62/248,235, titled "Automated Compliance Scripting and Verification," filed Oct. 29, 2015; both applications are incorporated by reference herein in their entireties.

TECHNICAL FIELD

Embodiments described herein generally relate to electronic processing activities occurring in connection with data verification, data entry, and data output systems, and in particular, but not by way of limitation, to a system and method for determining, outputting, and verifying disclosure messages and other information that is being output during data collection and processing activities in an information processing system.

BACKGROUND

During the initiation or subscription to various services, a disclosure or informative message is often provided to a human user. For example, in a setting where a customer decides to initiate or sign up for a new service from a business, there may be a legal requirement that a certain disclosure is displayed, audibly read, or otherwise provided from the business to the customer. In some cases, the disclosure or informative message must be identically provided, word-for-word (verbatim), without any deviation from the legally required language.

Existing techniques for verifying disclosure processes may occur in a quality assurance setting, long after the session with the customer has occurred and the customer has begun use of the service. Existing techniques that attempt to ensure a proper disclosure process, such as processes that are implemented during an interaction session with a human user, are generally limited to manual checklists, rules, and scripts that are subject to human error and oversight.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
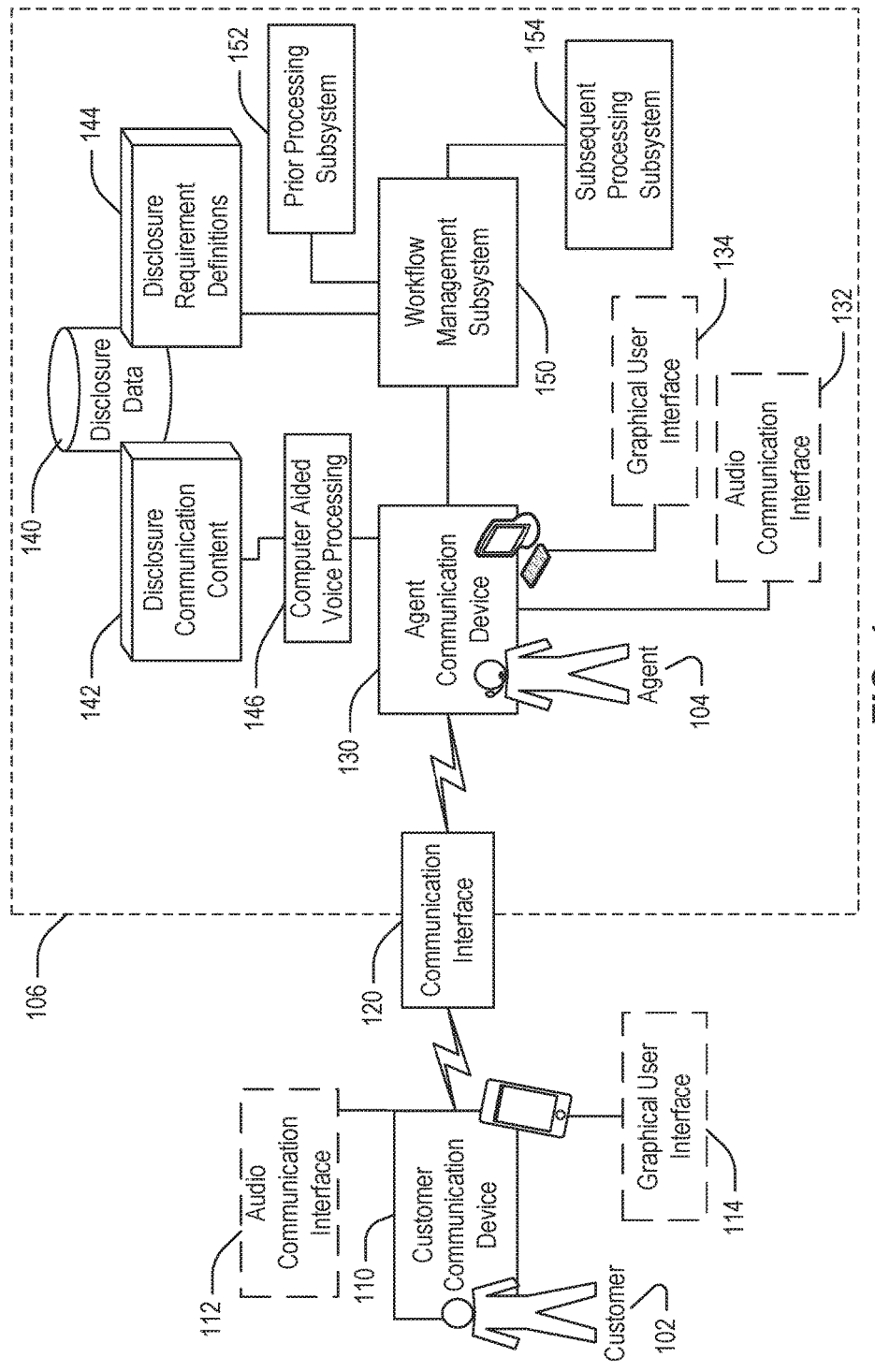
FIG. 1 is a diagram of an electronic communication environment depicting operations and interactions with a disclosure verification system, according to various examples.

In the following description, for purposes of explanation, numerous specific details are set forth in order to provide a thorough understanding of some example embodiments. It will be evident, however, to one skilled in the art that the present disclosure may be practiced without these specific details.

In various examples described herein, an automated compliance scripting process is established, configured, and implemented in an electronic disclosure verification system, to guide service provider users (e.g., agents or employees) and consumer users (e.g., customers or clients) within scenarios where a compliance disclosure script or similar compliance requirement is imposed. The automated compliance scripting process may occur in a variety of interaction settings between humans, including in audio-based (e.g., telephone), text-based (e.g., chat), and video-based (e.g., videoconference) sessions established between service provider users and customer users. As described herein, the automated compliance scripting process is used to ensure (and verify) the output of a correct script at a correct time, thus preventing human error, out-of-turn actions, or improperly proceeding with actions in a process workflow when a disclosure requirement has not been satisfied.

As a result of the automated compliance scripting process, various disclosures may be output to customer users at an appropriate time, and related electronic systems may enforce data entry requirements and workflow prerequisites related to the disclosure. Also as a result of the automated compliance scripting process, the incidence of incorrect, improper, or missing disclosures and workflow steps can be greatly reduced, and compliance with legal, process, and technical requirements can be increased. Further, activity of the automated compliance scripting process may be used to enhance monitoring, audit, and verification conditions for a variety of disclosure requirements, resulting in a consistent and uniform experience for customers, and uniform data entries and data states for records in an information processing system.

In one example, the presently described disclosure verification system may be used in a telephone or voice call center, to determine and verify compliance with legal disclosure requirements during the initiation, modification, or addition of services offered by agents of a company or service provider. These legal disclosure requirements may include legal notices, consumer protection notices, privacy policy notices, and like statements that are read audibly to the user during a phone call session. Additionally, the presently described disclosure verification system may be used to provide customized versions of the legal disclosure statements (customized to the language or characteristics of the phone call user), optional explanatory statements that are helpful or that answer questions, or other types of contextual statements.

As further described in the following examples, legal and informative disclosures also may be output to a customer during a specialized phase of an electronic process workflow, such as a process workflow that is used during the creation or change to a particular service. This specialized phase may "pause" or "hold" further activity from proceeding in the electronic process workflow, to ensure that the disclosure is provided, e.g., read, viewed, transmitted, or otherwise output to a customer before further actions take place in the electronic process workflow. Returning to the previous call center example, a specialized phase in a new service process workflow may prevent the new service from being opened or subscribed to by a customer service agent, until the disclosure verification system determines that the entire text of the disclosure has been read audibly to the customer.

FIG. 1 is a diagram of an electronic communication environment depicting various operations and interactions with a disclosure verification system 106. In this diagram, the components of the disclosure verification system 106 are illustrated, and it will be understood that the disclosure verification system 106 may include a variety of devices, interfaces, data sets, and subsystems to assist the operation of a communication session between a customer 102 and an agent 104. As shown, this communication session may be facilitated with the use of a communication interface 120. Although only one instance of the customer 102, one instance of the agent 104, and one instance of the communication interface 120 is depicted in FIG. 1, it will be apparent that in a particular communication session, more than one agent (and likewise, more than one customer and communication interface) may be involved.

As illustrated, the customer 102 operates a customer communication device 110, utilizing an audio communication interface 112 (e.g., phone call functionality), a graphical user interface 114 (e.g., internet content functionality, such as a mobile app, website, etc.), or both. The communication interface 120 (e.g., a phone call session over a phone network) will connect the customer communication device 110 with the agent communication device 130. The agent communication device 130 may also include an audio communication interface 132 and a graphical user interface 134, allowing the agent 104 to control the communication session with the customer 102 and interact with the customer 102 through the use of voice communications.

In one example, the communication interface 120 may be implemented through an audio interface provided in a telephone call session, with the use of phone routing equipment, call switching, and hold call functionality, and like features for audio interaction such as Interactive Voice Response (IVR) in a telephone audio session between two or more users. In another example, the communication interface 120 may be implemented through a video interface provided in a videoconference session, with the use of video cameras, microphones, streaming audio/video data, and like features for audio/video interaction in a videoconference session between two or more users. In another example, the communication interface 120 may include a display interface for generating, outputting, or displaying features for display interaction in a web session such as a text chat between two or more users (including, in some examples, the use of text-to-speech, speech-to-text, and text translation functionality, which may be assisted by computer aided voice processing 146).

The communication interface 120 may connect the customer communication device 110 with the agent communication device 130 through the use of any number of communication technologies. In various examples, the servers and components of the diagram may communicate via one or more networks, which may include one or more of local-area networks (LAN), wide-area networks (WAN), wireless networks (e.g., IEEE 802.11 or cellular networks), the Public Switched Telephone Network (PSTN) network, ad hoc networks, cellular, personal area networks or peer-to-peer (e.g., Bluetooth®, Wi-Fi Direct), or other combinations or permutations of network protocols and network types. The one or more networks may include a single local area network (LAN) or wide-area network (WAN), or combinations of LANs or WANs, such as the Internet.

The operation of the disclosure verification system 106 further includes functionality for operation with an electronic process workflow, which in FIG. 1, is managed by a workflow management subsystem 150. The workflow management subsystem 150 operates to control processing actions and inputs/outputs in the process workflow, such as may be collected with information screens, prompts, and directions in the process workflow to achieve some business or technical result (e.g., to subscribe to a new service with a company). Such information screens, prompts, and directions may be output to the agent 104 in the graphical user interface 134 on the agent communication device 130, to assist the agent 104 in collecting certain information from the customer 102 in the process workflow. In other examples, the agent 104 may use alternate or additional electronic devices and user interfaces to interact with the workflow management subsystem 150, and achieve the business and technical objectives in the process workflow.

As part of the process workflow occurring during the communication session between the agent 104 and the customer 102, certain disclosures may be required to be communicated to the customer 102. As further described below, the disclosure may be provided from a relevant portion of disclosure communication content 142, stored in a disclosure data database 140 or like electronic data management system. Additionally, the disclosure data database 140 may include a set of disclosure requirement definitions 144 that provide definition for the timing, conditions, and characteristics of the disclosure to occur within the process workflow.

The workflow management subsystem 150 may operate to provide a series of electronic processing activities in the process workflow used in the communication session between the agent 104 and the customer 102. These electronic processing activities may include the use of a prior processing subsystem 152 that assists the collection of information and other activities by the agent, prior to the required disclosure; and a subsequent processing subsystem 154 that assists the collection of information and other activities occurring after the required disclosure. The workflow management subsystem 150 may obtain and parse the disclosure requirement definitions 144 to determine the timing, conditions, and characteristics of the disclosure, such as to determine where in the process workflow is the appropriate time and condition to provide an output disclosure to the customer 102.

In various examples, the workflow management subsystem 150 communicates with the prior processing subsystem 152 and the subsequent processing subsystem 154 using an interface such as an application programming interface (API) or a proprietary data exchange interface. Accordingly, in some examples, the prior processing subsystem 152 and the subsequent processing subsystem 154 may be separate software applications whose operations are controlled or overseen by the workflow management subsystem 150.

Although the prior processing subsystem 152 and the subsequent processing subsystem 154 are depicted as separate from the workflow management subsystem 150, in some examples, the features of the processing subsystems 152, 154 are included within a common processing system or single software application. Additionally, the interaction between the agent communication device 130 and the workflow management subsystem 150 may include a number of graphical user interface control screens (e.g., a customer information screen presented in graphical user interface 134) to allow the agent 104 to collect information for the process workflow, and to allow the agent 104 to control or influence the output of the disclosure communication content 142.

In one example, the disclosure communication content 142 is first provided to the agent communication device 130, and is then communicated to the customer 102 via the communication interface 120. As further described below, the output of this disclosure communication content 142 may be customized or changed by the agent 104. In some examples, the disclosure output is assisted through the use of the computer aided voice processing 146, such as with use of an interactive voice response telephone interface communicated to by the customer 102. In other examples, the disclosure communication content is communicated directly to the customer 102 through the communication interface 120 without use of the agent communication device 130.

As a result of the disclosure verification system 106 operations, various disclosure communication content 142 is communicated to the customer 102, and a status of the disclosure output is provided (and tracked) in the workflow management subsystem 150. In a phone banking setting, for example, the disclosure verification system 106 may be used to ensure compliance with regulatory requirements for telephone or voice banking services, where the customer 102 verbally communicates with a representative of the banking institution (the agent 104), and the representative assists the customer 102 to obtain new services in a process workflow tailored to a specific banking product or service. For example, the disclosure verification system 106 may be used to communicate, in an automated fashion, the legally required disclosures that are required before opening the new services in the process workflow. In this phone banking setting, the disclosure verification system 106 may prevent some action from being completed (such as a new account from being opened) or further actions from being conducted in the process workflow, until the workflow management subsystem 150 records an indication that the legally required disclosures have been output to the customer 102.

In one example, the disclosure communication content 142 includes audible messages that are prerecorded and stored in the disclosure data database 140. The audible messages that are output to a user may include: "verbatim" message types, e.g., messages that must be read word-for-word, identically on script, and are often based on legal or regulatory language (such as consumer notices established by a governmental agency); "required" message types, e.g., messages that must be read to the customer, often based on legal, regulatory, or process requirements, but whose content is allowed to be paraphrased, reformatted, or changed slightly, as long as the substance of the content is provided to the consumer; and "suggested" message types, e.g., messages which are included to assist the customer as part of some process workflow, but are not legally required. A customer interaction may include one or all of these types of messages, depending on the service being requested or changed, the level of understanding expressed by the customer, and the like. In some examples, the disclosure requirement definitions 144 includes an indication of the type of audible message to be provided to the customer 102.

The disclosure communication content 142 and disclosure requirement definitions 144 stored in the disclosure data database 140 may be associated with any number of workflow conditions, content types, and may be implemented with use of a database management system, information repository, content management system, or like data storage system (including a custom data storage system). In a further example, the disclosure communication content 142 and the disclosure requirement definitions 144 may include the features depicted in FIG. 2, and may include respective properties that define the type of content and the conditions for outputting the type of content within specific process workflows.

Figure 2:
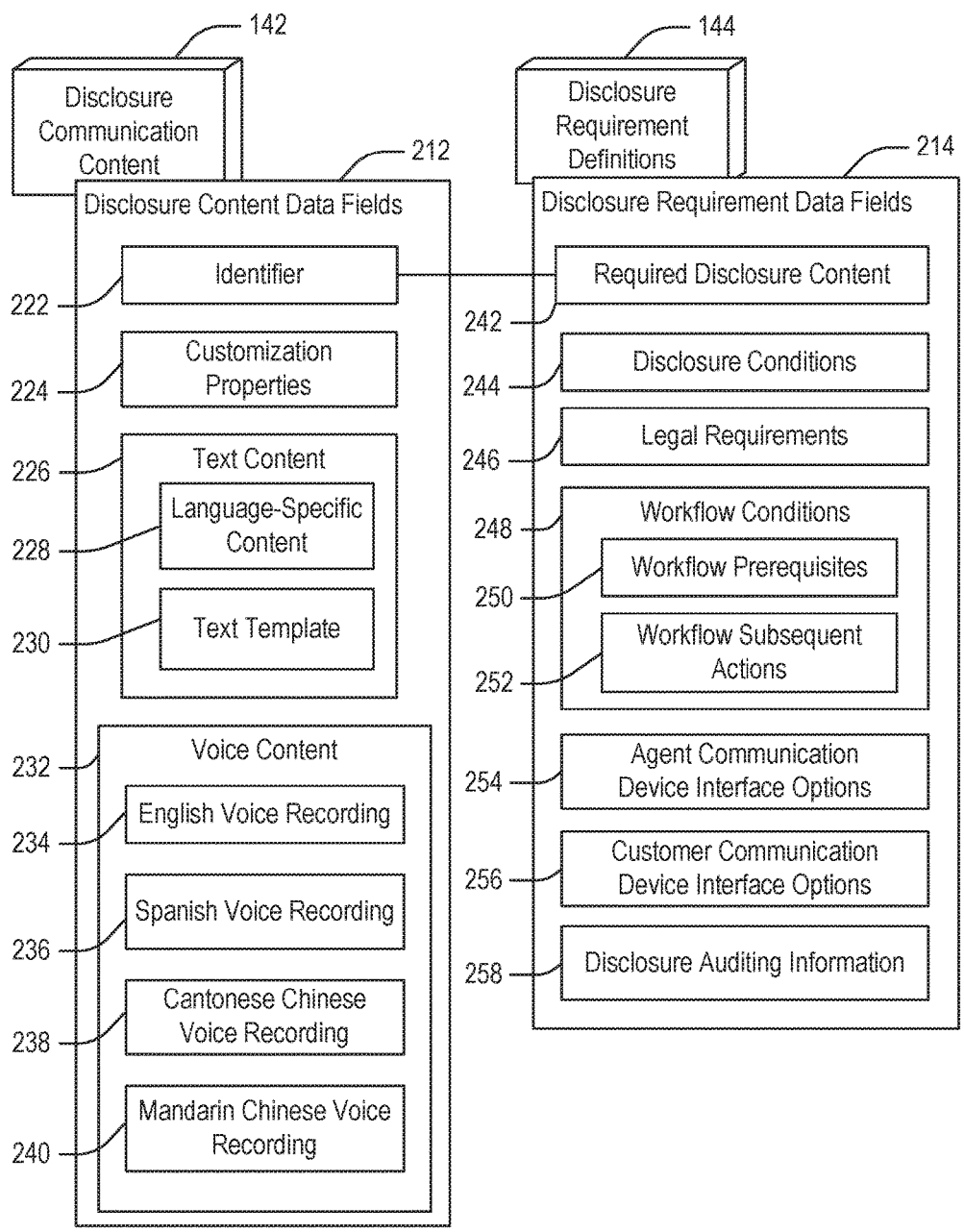
FIG. 2 is a data schematic of data values used in a disclosure verification system, according to various examples.

FIG. 2 provides an illustration of a data schematic of disclosure data values used in an electronic processing system, such as for use with the disclosure verification system 106, based on various disclosure content data fields 212 and various disclosure requirement data fields 214. As shown, the disclosure communication content 142 may establish the disclosure content data fields 212 to include an identifier 222, customization properties 224, text content 226, and voice content 232. The disclosure requirement definitions 144 may define the disclosure requirement data fields 214 to include a definition of required disclosure content 242, a definition of disclosure conditions 244, a definition of legal requirements 246, a definition of workflow conditions 248, a definition of agent communication device interface options 254, a definition of customer communication device interface options 256, and a definition of disclosure auditing information 258. It will be understood that any of these data fields may be represented in an electronic system in the form of a template, container, linking, or rule definition to represent any of the characteristics electronically in data.

The disclosure content data fields 212 may use the identifier 222 to provide an association or linking to a particular disclosure requirement definition (e.g., to link the required disclosure content 242 in the disclosure requirement data fields 214). Accordingly, a particular disclosure requirement may be associated with a particular disclosure message, including different versions of such disclosure message, whether text or voice, and based on multiple available languages or other customization. Further, the disclosure content data fields 212 may use the customization properties 224 to define the types and ways in which a particular disclosure message may be customized by an automated system, an agent, a company, or other participant in the process workflow.

The particular disclosure message may be represented by text content 226, to generate text for a human agent or a text-to-speech computer system program to read in a script, to provide a written message to accompany an audio message, to output as text in a customer user interface, or to provide other textual indications. The text content 226 may include language-specific content 228 (such as text, vocabulary, or spelling) that is customized based on language, dialect, country, or region of the customer, agent, business, or service. Additionally, the text content 226 of the disclosure content may include a text template 230, which may be used for customizing a message to the characteristics of a particular customer. For example, the text template 230 may include breaks within a script or block of text to allow a human or a computer system to substitute text content customized to the particular customer. As a further example, a text-to-speech engine may be used for script automation of the text content 226, to allow variable outputs of a script or block of text for the disclosure in a particular format (including a language or dialect customized to the characteristics of the particular customer).

The particular disclosure message may also be represented by voice content 232 to provide an audible reading of the disclosure content. For example, a set of voice content may include multiple language recordings for a particular disclosure message, such an English voice recording 234, a Spanish voice recording 236, a Cantonese Chinese voice recording 238, and a Mandarin Chinese voice recording 240.

As previously discussed, the disclosure requirement data fields 214 may be linked (or otherwise associated or correlated with) a set of disclosure content, such as through a linking of the identifier 222 to a definition of required disclosure content 242 (e.g., disclosure requirements). Further, the disclosure requirement data fields 214 may define the disclosure conditions 244 to indicate the relationship or characteristics of particular disclosure messages to certain conditions. The disclosure requirement data fields 214 may also define additional requirements, conditions, rules, and use cases in an electronic format for use by associated processing systems (such as the workflow management subsystem 150 depicted in FIG. 1).

The disclosure requirement data fields 214 may include a set of legal requirements 246 that store data to indicate the specific conditions and requirements (e.g., timing requirements) of the particular disclosure message to satisfy a set of legal or regulatory requirements. This set of legal requirements 246 may be correlated with the workflow conditions 248 that define the workflow prerequisites 250 for providing the disclosure in a process workflow, and the workflow subsequent actions 252 that occur (or are enabled to occur) in the process workflow after conducting the disclosure.

The disclosure requirement data fields 214 may define the agent communication device interface options 254 to respond to the particular disclosure message (including agent options to select, start, replay, restart, pause, or cancel an output of the disclosure message to the customer). Similarly, the disclosure requirement data fields 214 may define the customer communication device interface options 256 to indicate the available options to a customer to respond to the particular disclosure message (including customer options to accept, deny, replay, restart, pause, or cancel the output of the disclosure message).

The disclosure requirement data fields 214 may also include disclosure auditing information 258, used for defining the data values to capture a customer's response to the disclosure, or to capture the time, date, or interaction characteristics of the output of the disclosure message to the customer. For example, the disclosure auditing information 258 may be used to retain a record that the disclosure message was output to the customer at a particular time, date, and what actions were initiated in response to the output.

Through an implementation of the disclosure requirement data fields 214 and associated disclosure content data fields 212 with the disclosure verification system, customer service agents can be prevented from failing compliance requirements and auditable tasks (and, specifically, prevented from failing to accurately read legally required disclosure information to customers). The operation of the disclosure verification system ensures that customers are properly informed, to reduce risk and compliance exceptions, and to prevent quality assurance issues.

In further examples, the presently disclosed disclosure verification system may be used to automate agent actions (including scripted actions) in a process workflow, to ensure that full and accurate disclosure is made to a customer prior to completing a portion or phase of the process workflow, or proceeding with the next action in the process workflow. As a result of the defined requirements, prerequisites, and subsequent actions, further actions in the process workflow may be disabled or prevented until the disclosure message has been output correctly to the customer.

Figure 3:
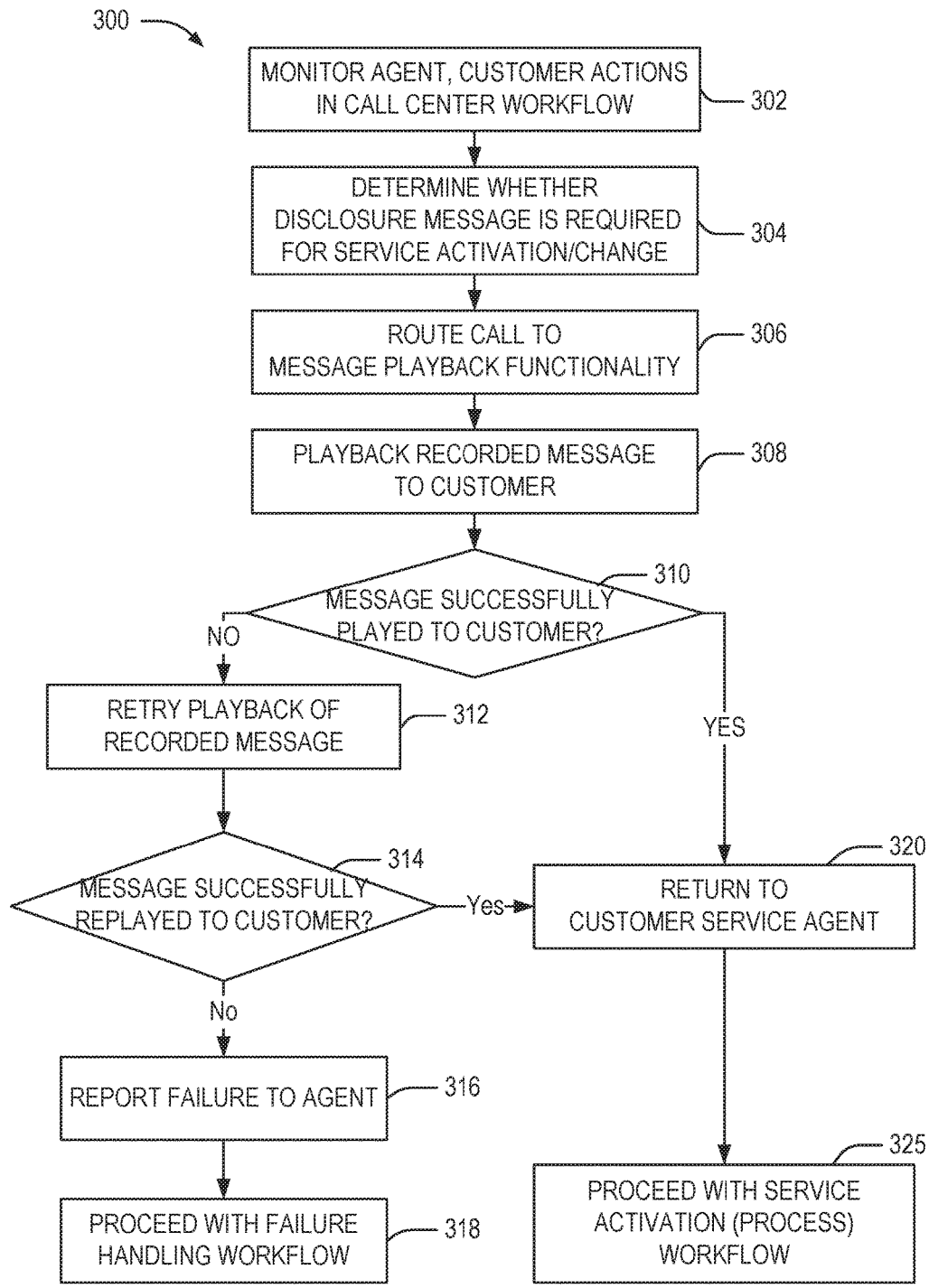
FIG. 3 is a flowchart of an example disclosure workflow in a call center use case of a disclosure verification system, according to various examples.

FIG. 3 illustrates a flowchart 300 of an example disclosure workflow, occurring in a telephone call center use case for operation of a disclosure verification system, according to another example. For example, in a call center environment that offers customer servicing for financial products and services, a disclosure message or other information often needs to be read to the customer by a customer service agent before a product or service can be canceled, changed, or added to the customer's account. In this call center environment, the workflow of FIG. 3 provides an illustration of the various computing operations and determinations that ensure an audible output of the script playback functionality to the customer, and that integrate with a call center process workflow to modify or change an account for a particular product or service.

As shown, the operations in the disclosure verification system may monitor agent actions or customer actions (or both parties' actions) in a call center process workflow (operation 302). For example, when activating a new financial service such as opening a new account, a call center process workflow will be followed by the agent to sequentially walk the customer through the collection of necessary information (such as through the use of a script of interaction questions and responses to be read by the agent). As detailed below, this call center workflow may also be modified to provide automated disclosure messages that are necessary to proceed with opening the account.

The operation of the call center action workflow continues as the interaction occurs between the agent and customer in the phone call. As shown, the disclosure verification system may determine a disclosure condition for service activation (operation 304), such as by detecting whether a particular disclosure message is required for service activation. In one example, agent actions and disclosure message prompts in the call center process workflow are triggered through a series of user interface definitions or rules, such as when an agent reaches a certain user interface screen in the process workflow. In other examples, a speech recognition system may operate during a call to monitor compliance with scripting and to detect when to output a disclosure message. For example, the conversation between the agent and customer could be tracked and analyzed to determine, based on context of the conversation, whether a disclosure message should be output to the customer.

Upon detection of this disclosure condition, the compliance verification system will proceed to ensure the output of the needed disclosure messages. In a phone environment, the disclosure verification system may perform various actions to transfer or conference the call with message playback functionality for a particular message. For example, in a call center, the playback functionality for a recorded message may including routing or conferencing a call to a recorded phone message playback functionality (operation 306). In another example, the recorded playback functionality may involve use of a text-to-speech engine which provides an audible reading of a defined text script in a defined language selection.

Next, the message playback may occur using an additional phone line that is conferenced into the call between the banker and customer. As a result, a voice narration of the disclosure language, included in a recorded message, may be played to the customer in the conferenced phone line (operation 308). During the time that the recorded message is played, user interface functions related to the process workflow and call management may be disabled, such as to prevent the agent from moving to the next screen of the workflow, disconnecting or transferring the call, or like actions, until the recorded message completes playback.

In some examples, the recorded message is pre-recorded in its entirety; in other examples, the recorded message includes a combination of selected messages, phrases, or words (for example, to provide a playback customized to the service or context, such as to substitute a reference of "25 dollars" for "100 dollars" within the message), or as is otherwise provided from text-to-speech functions. Other customizations and variations to the disclosure message may be provided based on the customer, agent, or product characteristics.

As a result of the playback of the recorded message, a determination is made based on whether the message has been successfully played to the customer (decision 310). For example, this determination may occur automatically as a result of the prerecorded message ending, as a result of an agent concluding the recorded message, or as a result of an interactive voice prompt confirming that the customer has heard the entirety of the recorded message.

Upon a determination that the recorded message has not been successfully played to the customer, various remedial actions may occur to retry the playback. For example, the playback of the recorded message may occur for a second time (operation 312). In some examples, adjustments to the playback of the recorded message may occur, including changes to speed, volume, tone, language, or other characteristics of the recording. In further examples, the format or the type of message may also be changed (providing an alternate text disclosure sent to an electronic device of the customer, such as with an SMS text message or email message, if the voice message is unable to be output to, acknowledged from, or understood by the customer).

Upon a determination that the recorded message has not been successfully replayed to the customer (decision 314), the disclosure verification system may perform further processing to report the failure to the agent (operation 316), and proceed with a failure handling workflow (operation 318). This failure handling workflow may include logging the error, escalating the call to another agent or a manager, or providing recommendations to the agent or customer to attempt the required disclosure in another form or at a later time.

Upon a determination that the recorded message has been successfully played to the customer (decision 310), or successfully replayed to the customer (decision 314), the workflow proceeds to redirect the customer call to control of the customer service agent (operation 320). As a result of the workflow, tracking information may be passed within the disclosure verification system to track the status of the disclosure output. This tracking information may include auditable date and time characteristics, a record of whether the customer has responded to the recorded message, a data record (such as a recording) of the customer's response, or other information. This tracking information may also result in a message or command that is communicated within the disclosure verification system, to allow the agent to proceed with the activation of the product or service (and the resumption of the process workflow) (operation 325).

In some examples, control over the disclosure outputs may be provided to the agent. For example, the agent may be provided with controls that may pause, rewind, or restart the playback of the recorded message. However, the agent may be prevented from moving on to the next step in the process workflow (e.g., initiating, opening, or selecting the requested product or service) until the recorded message is played in its entirety. This may involve locking, disabling, or freezing certain functionality in a user interface for the agent until the determination of the successful playback indicates a successful disclosure. Also in some examples, the agent cannot move to the next step of the process workflow to obtain or process further actions with the service until the customer has provided consent to the message (or verified that she or he has understood the message, or agrees to proceed in light of the disclosure).

In some examples, the disclosure message output may be conducted directly by a reading performed by the agent, rather than using a recorded message. For example, a speech recognition system could analyze or monitor the speech that is output to the customer, to assure that a script is recited correctly, based on the type of disclosure message (e.g., whether verbatim, required, or suggested message types). In other examples, the disclosure message output may be conducted by automated voice playback software, a text-to-speech interface, or other computer-assisted processing.

In some examples, the agent may be provided with user interface features to assist the playback of the recorded message. For example, an agent may be presented with a selectable link at a particular point in the workflow, to populate the automated voice system's number into a screen, and transfer the customer call to recorded playback functionality. From this user interface, the agent may click on a play button or control (or, alternately, the message may automatically start playing), such as after the agent explains that a recorded message will be played to the customer. In some examples, the agent is also conferenced into the call to listen to the pre-recorded message at the same time as the customer.

Figure 4:
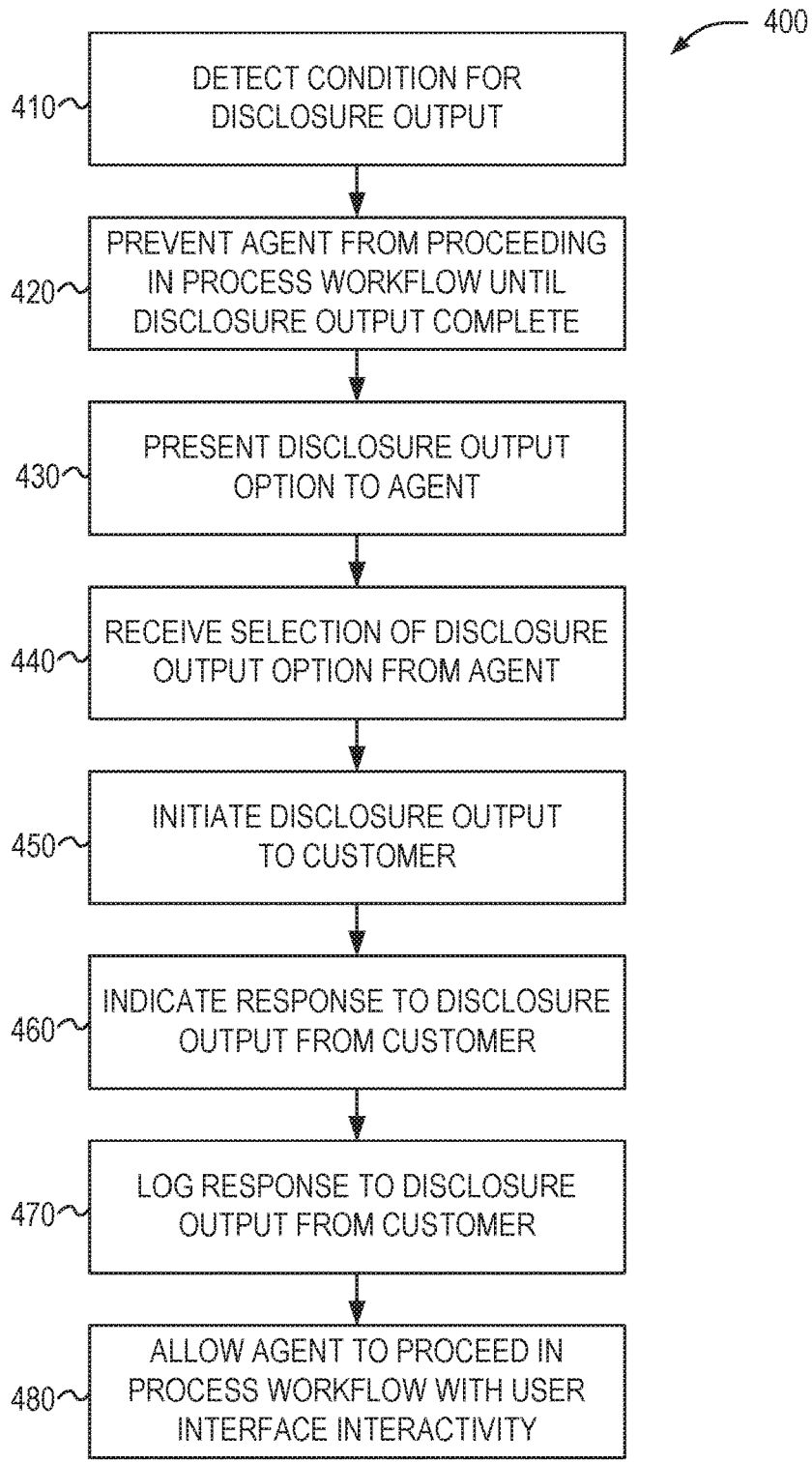
FIG. 4 is a flowchart of an example processing workflow in a computer-based user interface for a disclosure verification system, according to various examples.

FIG. 4 depicts a flowchart of an example disclosure processing workflow 400 in a computer-based user interface of a disclosure verification system, according to another example. The operation of the disclosure workflow 400 from FIG. 4 may be used, for example, to implement the call center process in the flowchart 300 described above. However, it will be apparent that the operation of the workflow 400 may also be used in other settings, not directly applicable to phone calls or phone sessions, such as at other electronic interfaces used by customers and agents (e.g., computers, mobile devices, kiosks, and the like).

The disclosure workflow 400 includes a series of steps for verifying the output of the disclosure message. As shown, the disclosure processing workflow 400 includes the detection of a condition for disclosure output (operation 410). This condition may be automatically detected as a result of reaching a designated point in an interaction script or process workflow. This condition may also be detected as a result of navigation to a designated point of a user interface, a selection from a menu, or other automated or human-assisted interaction with the user interface.

In response to the detection of the condition for the disclosure output within the process workflow, the agent is prevented from proceeding in the process workflow (operation 420). The agent may be prevented from proceeding with subsequent screens, actions, or processes in the user interface that implements the workflow until the required disclosure is output in its entirety to the customer. In further examples, the agent may be prevented from proceeding in the user interface until not only the disclosure is output in its entirety, but the customer also provides confirmation of assent or acknowledgment of the message. Accordingly, when the process workflow is paused (or stopped), the following operations may occur to allow the output of the disclosure information.

The agent may be presented with a disclosure output option (operation 430) in the user interface, to control the output (e.g., playback) of a prerecorded message. The disclosure output option may include a plurality of selection options, such as multiple languages in which the disclosure message can be played back. In other examples, the disclosure output options may include customization properties, which are automatically populated by the disclosure verification system, or manually entered by the agent, to allow a customization of the output options.

The disclosure verification system may receive and process a selection of a disclosure output option (operation 440) received in the user interface from the agent, such as a designation of a language and a command to commence playback. The disclosure workflow 400 then continues by initiating the output of the disclosure message to customer (operation 450). In connection with the techniques described in FIG. 3, this may include the transfer and playback of a message in a telephone interface, including providing a user interface feature to oversee the transfer of a customer call using a message playback interface and controls.

When the disclosure message completes playing, a response to the disclosure output from the customer may be provided in the user interface (operation 460). This may include a completed status indication of the message playback, and an indication of the detected customer reply (e.g., an audible "yes" provided in response to a voice prompt, "do you want to proceed") to the message playback, or like status messages being output to the agent. In some examples, a status of the playback of the disclosure message is maintained and logged in the disclosure verification system (operation 470) for future auditing, verification, and compliance monitoring purposes.

As a result of a successful output of a disclosure message to a customer, user interface interactivity or other features of the process workflow may be enabled (operation 480). For example, an agent user interface screen may be modified to allow the progression of the process workflow to a next step, thus allowing further actions in the workflow to be initiated, resumed, or completed.

Figure 5:
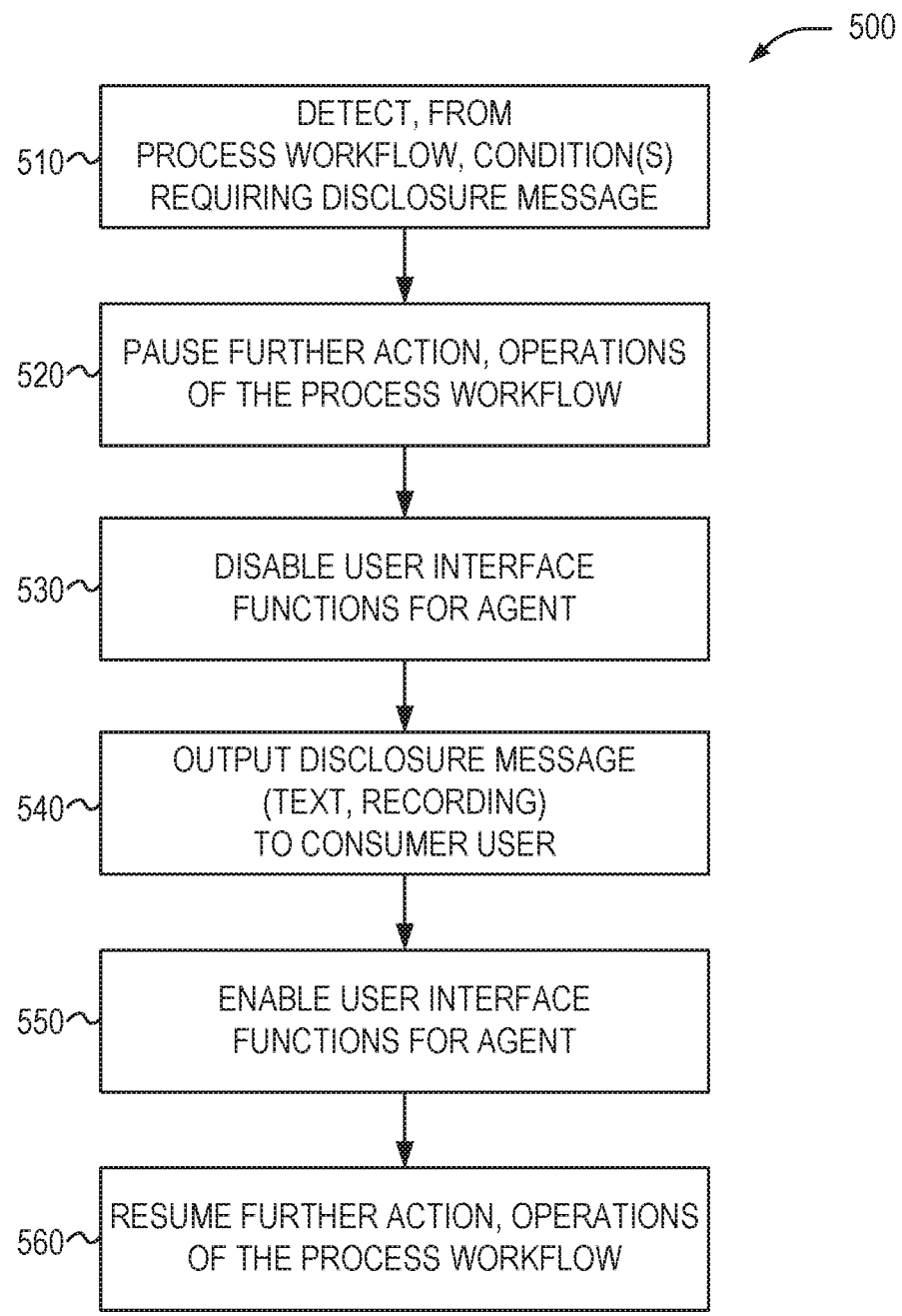
FIG. 5 is a flowchart of an example method of automated compliance scripting output and workflow control provided from a disclosure verification system, according to various examples.

FIG. 5 illustrates a flowchart 500 for a method for outputting a disclosure message, according to various examples. The method of the flowchart 500 may be performed by any of the components, logic, or systems described herein. For example, the method may be embodied through processes executing on a computer system. Also for example, the method may be embodied through software instructions included in a non-transitory machine-readable medium, configured to execute on a computer system.

In an example, at block 510, the method begins by detecting, from a process workflow, one or more conditions that requires a disclosure message. This detecting may occur based on a detected context (such as through voice recognition or keywords used in a communication session), or based on certain points resulting from scripted events or actions in a process workflow employed with a communication session between an agent and customer.

In an example, at block 520, the method continues with controlling operation of the process workflow, by pausing one or more actions or operations of the process workflow. In an example, at block 530, the method continues with disabling user interface functions for the agent. In some examples, pausing of the one or more actions or operations at block 520 may simultaneously cause the user interface functions that relate to the one or more actions or operations to become disabled.

In an example, at block 540, the method continues with outputting the disclosure message to the customer user. In some examples, this outputting includes playing an audio recording to the customer user in the communication session that is pre-recorded or is generated from text-to-speech functionality. In other examples, this outputting includes transmitting textual content to the customer user in the communication session (or in an additional communication session).

After successfully outputting the disclosure message to the customer user, further processing may occur to continue with the process workflow. In an example, at block 550, the method continues with enabling user interface functions for the agent user, such as to enable the functions disabled at block 530. In an example, at block 560, the one or more actions or operations of the process workflow are resumed. In some examples, the resumption of the one or more actions or operations may be directly correlated to simultaneously enable user interface functions that relate to the one or more actions or operations.

Figure 6:
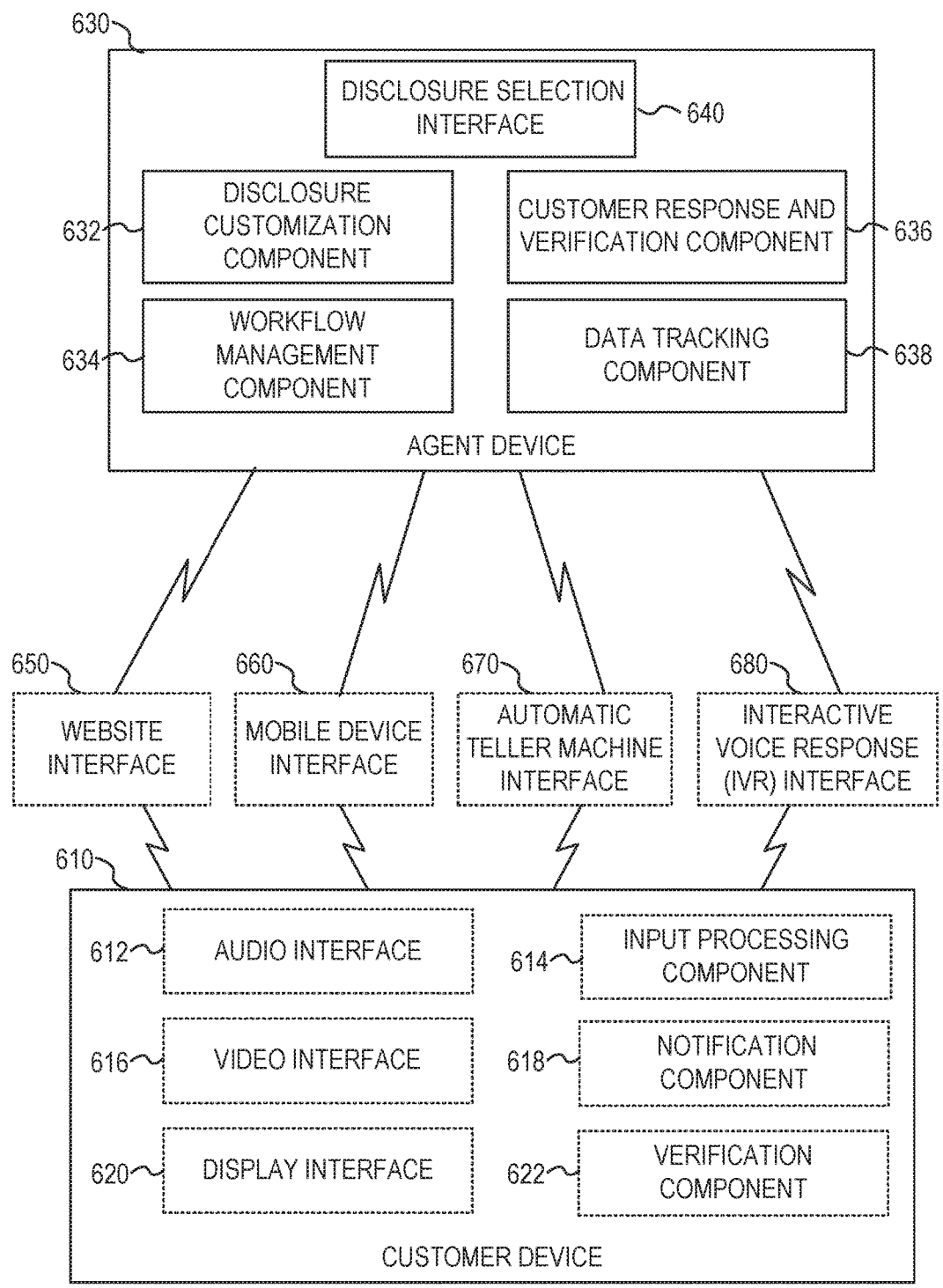
FIG. 6 illustrates an example block diagram of an agent device, customer device, and device communication interfaces used in connection with the operation of a disclosure verification system, according to various examples.

FIG. 6 illustrates a block diagram 600 for components of various devices used in operations with a disclosure verification system according to an example. For example, in connection with the agent-customer interaction scenarios previously described, the electronic devices that interact with the compliance verification system may include a customer device 610 and an agent device 630.

In an example, the customer device 610 includes various components that provide for the input and output of audiovisual content. For example, the customer device 610 may include: an audio interface 612, which provides output of audio (e.g., speech) to a customer; a video interface 616, which provides output of visual content (e.g., video conference content) to a customer; a display interface 620 which provides output and control of display content, including textual disclosure content output; an input processing component 614, which provides processing functions to receive input (e.g., confirmation and selections) from the customer; a notification component 618, which provides notifications to a customer, based on the disclosure workflow; a verification component 622, which provides a verification of customer actions or inputs. Accordingly, to implement the interfaces 612, 616, 620, and components 614, 618, 622, the customer device 610 may include or be coupled to specialized software, hardware, or combinations thereof.

In an example, the agent device 630 includes various components that provide for control of the disclosure workflow, and related agent-customer interactions. For example, the agent device 630 may include: a disclosure customization component 632 that performs operations to customize the language, content, or other output characteristics of the disclosure content, based on the selections of the agent, customer, or characteristics of the interaction; a workflow management component 634, which performs operations to pause, start, stop, and otherwise control the operations of the process workflow; a customer response and verification component 636, which performs operations to monitor the response of the customer to the disclosure, including any required consent or acknowledgement; a data tracking component 638, which performs operations to track the status of the disclosure output, any customer response to the disclosure output, and other information needed to successfully track and audit procedures in the disclosure workflow; and a disclosure selection interface 640 to receive agent selections of particular disclosure messages, disclosure customizations, and other changes to the output disclosure message.

The communications occurring between the agent device 630 and the customer device 610 may occur via any number of interfaces, networks, or platforms, again depending on the type or format of the disclosure and any relevant requirements of the disclosure message, agent, or customer. For example, the communications may occur in connection with: web page and dynamic content provided through a website interface 650; mobile application (app) content provided through a mobile device 660; specialized machine content specialized for a kiosk or other specialized machine, such as provided through an automatic teller machine (ATM) interface 670; phone call interactivity, such as is provided in an IVR interface 680 (including the use of an IVR interface that processes human speech from a party or provides human-output speech from scripts or text).

Figure 7:
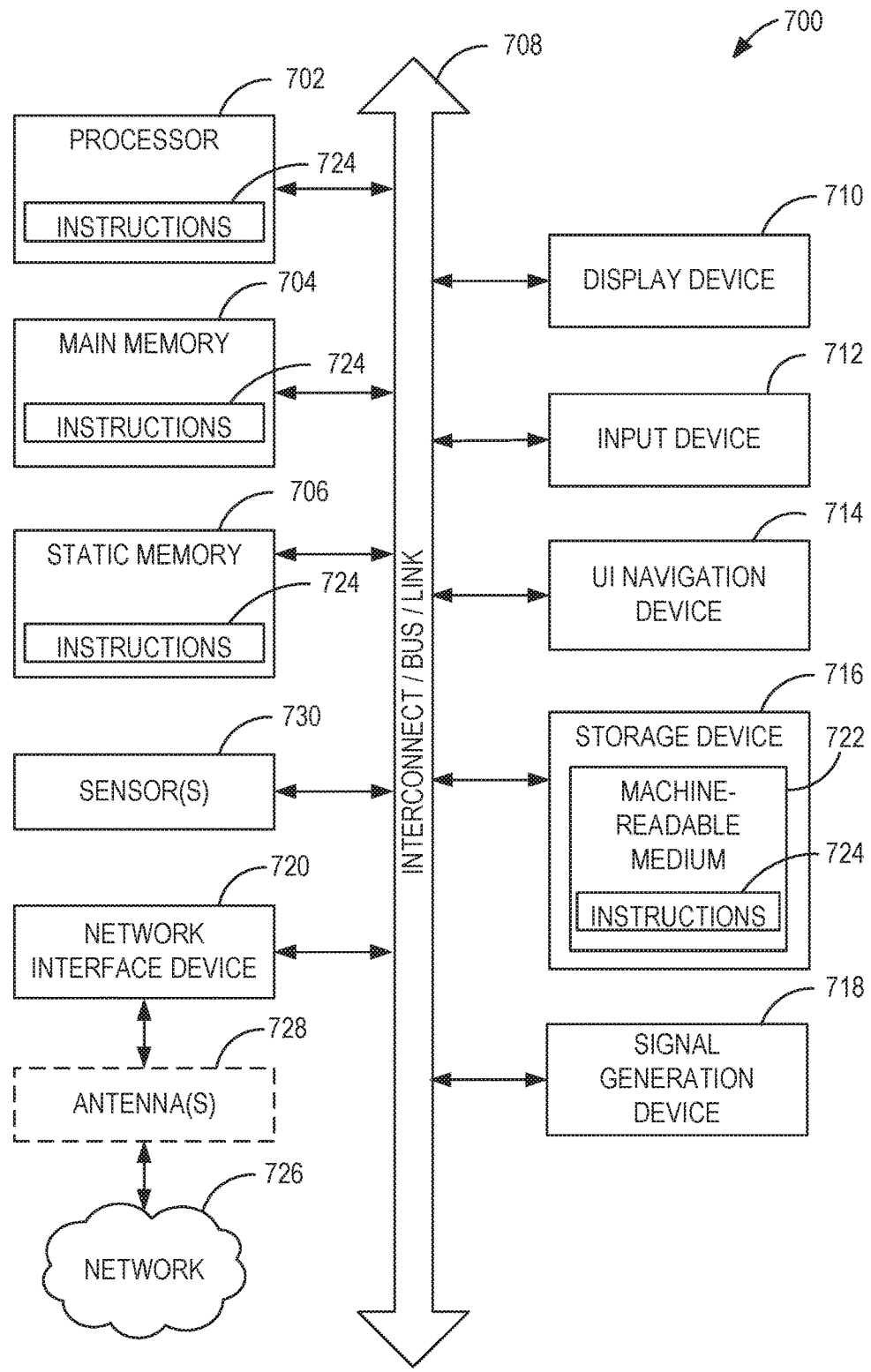
FIG. 7 is a block diagram of a machine in the example form of a computer system within which a set of instructions, for causing the machine to perform any one or more of the methodologies discussed herein, may be executed.

FIG. 7 illustrates a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus or interconnect). The computer system 700 may further include a video display unit 710, an input device 712 (e.g., an alphanumeric keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors 730, such as a global positioning system (GPS) sensor, compass, accelerometer, location sensor, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). The communications with the communications network 726 optionally may occur using wireless transmissions sent via one or more antennas 728. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. Further, although some of the examples were provided in relation to the subscription or modification of financial-related services in a telephone call center, it will be understood that the examples may be applicable to a variety of other industries and communication mediums, and the presently described techniques may also be performed upon other types of service workflows.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method comprising:
   detecting, from a first action conducted in a process workflow, a condition requiring an output of a recorded audio message to a customer user; and
   controlling the output of the recorded audio message in a communication session with the customer user, in response to the detection of a condition requiring the output of the prerecorded audio message, by:
   pausing a second action, subsequent to the first action, in the process workflow;
   commencing the output of the recorded audio message to the customer user in the communication session; and
   resuming the second action in the process workflow, in response to detecting that the recorded audio message has been delivered to the customer user in its entirety.

2. The method of claim 1, wherein the recorded audio message corresponds to text of a required disclosure message.

3. The method of claim 2 further comprising:
   retrieving a disclosure requirement definition associated with the required disclosure message, the disclosure requirement definition identifying the condition requirement to playback the recorded audio message in the process workflow.

4. The method of claim 3, wherein the disclosure requirement definition further identifies a version of the required disclosure message to output to the customer user.

5. The method of claim 1, wherein the recorded audio message is combination of selected phrases.

6. The method of claim 1, wherein detecting that the recorded audio message has been delivered to the customer user in its entirety is based on a customer response to the playback of the recorded audio message.

7. The method of claim 1, wherein detecting the condition requiring the output of the recorded audio message to the customer user includes analyzing one or more phrases or keywords used in the communication session with the customer user.

8. A non-transitory computer readable medium comprising instructions, which when executed by at least one processor, configure the at least one processor to perform operations comprising:
   detecting, from a first action conducted in a process workflow, a condition requiring an output of a recorded audio message to a customer user; and
   controlling the output of the recorded audio message in a communication session with the customer user, in response to the detection of a condition requiring the output of the prerecorded audio message, by:
   pausing a second action, subsequent to the first action, in the process workflow;
   commencing the output of the recorded audio message to the customer user in the communication session; and
   resuming the second action in the process workflow, in response to detecting that the recorded audio message has been delivered to the customer user in its entirety.

9. The non-transitory computer-readable medium of claim 8, wherein the recorded audio message corresponds to text of a required disclosure message.

10. The non-transitory computer-readable medium of claim 9, the operations further comprising:
    retrieving a disclosure requirement definition associated with the required disclosure message, the disclosure requirement definition identifying the condition requirement to playback the recorded audio message in the process workflow.

11. The non-transitory computer-readable medium of claim 10, wherein the disclosure requirement definition further identifies a version of the required disclosure message to output to the customer user.

12. The non-transitory computer-readable medium of claim 8, wherein the recorded audio message is combination of selected phrases.

13. The non-transitory computer-readable medium of claim 8, wherein detecting that the recorded audio message has been delivered to the customer user in its entirety is based on a customer response to the playback of the recorded audio message.

14. The non-transitory computer-readable medium of claim 8, wherein detecting the condition requiring the output of the recorded audio message to the customer user includes analyzing one or more phrases or keywords used in the communication session with the customer user.

15. A system comprising:
    at least one processor;
    a storage device comprising instructions, which when executed by the at least one processor, configure the at least one processor to perform operations comprising:
    detecting, from a first action conducted in a process workflow, a condition requiring an output of a recorded audio message to a customer user; and
    controlling the output of the recorded audio message in a communication session with the customer user, in response to the detection of a condition requiring the output of the prerecorded audio message, by:
    pausing a second action, subsequent to the first action, in the process workflow;
    commencing the output of the recorded audio message to the customer user in the communication session; and
    resuming the second action in the process workflow, in response to detecting that the recorded audio message has been delivered to the customer user in its entirety.

16. The system of claim 15, wherein the recorded audio message corresponds to text of a required disclosure message.

17. The system of claim 16, the operations further comprising:
    retrieving a disclosure requirement definition associated with the required disclosure message, the disclosure requirement definition identifying the condition requirement to playback the recorded audio message in the process workflow.

18. The system of claim 17, wherein the disclosure requirement definition further identifies a version of the required disclosure message to output to the customer user.

19. The system of claim 15, wherein the recorded audio message is combination of selected phrases.

20. The system of claim 15, wherein detecting that the recorded audio message has been delivered to the customer user in its entirety is based on a customer response to the playback of the recorded audio message.

* * * * *